US010157391B2

(12) United States Patent
Mathew et al.

(10) Patent No.: US 10,157,391 B2
(45) Date of Patent: Dec. 18, 2018

(54) DISTRIBUTED TELECOMMUNICATION NETWORK ARCHITECTURE AND DATABASE QUERY FOR AUDIENCE SEGMENTATION AND ANALYSIS

(71) Applicant: Zoomph, Inc., Reston, VA (US)

(72) Inventors: Thomas Mathew, Vienna, VA (US); Lee Kohn, Arlington, VA (US); John Seaman, Reston, VA (US); Ali Reza Manouchehri, Reston, VA (US); David Woo, Berkeley, VA (US)

(73) Assignee: Zoomph, Inc., Reston, VA (US)

( * ) Notice: Subject to any disclaimer, the term of this patent is extended or adjusted under 35 U.S.C. 154(b) by 0 days.

(21) Appl. No.: 15/862,605

(22) Filed: Jan. 4, 2018

(65) Prior Publication Data

US 2018/0268426 A1    Sep. 20, 2018

Related U.S. Application Data

(60) Provisional application No. 62/472,608, filed on Mar. 17, 2017, provisional application No. 62/479,650, filed on Mar. 31, 2017.

(51) Int. Cl.

| | |
|---|---|
| *G06Q 30/02* | (2012.01) |
| *G06Q 50/00* | (2012.01) |
| *H04L 29/08* | (2006.01) |
| *G06F 17/30* | (2006.01) |
| *G06F 3/0482* | (2013.01) |

(52) U.S. Cl.
CPC ......... *G06Q 30/0201* (2013.01); *G06Q 50/01* (2013.01); *H04L 67/306* (2013.01); *G06F 3/0482* (2013.01); *G06F 17/30029* (2013.01)

(58) Field of Classification Search
CPC .............................. H04W 4/02; H04W 88/06
USPC ..... 455/456.3, 411, 452.2, 420, 556.1, 41.2; 705/2; 709/219
See application file for complete search history.

(56) References Cited

U.S. PATENT DOCUMENTS

| | | | | |
|---|---|---|---|---|
| 2003/0198208 | A1* | 10/2003 | Koos, Jr. ............... | H04W 88/04 370/338 |
| 2005/0159970 | A1* | 7/2005 | Buyukkokten ........ | G06Q 30/02 705/319 |
| 2008/0248813 | A1* | 10/2008 | Chatterjee ................. | G01S 1/68 455/456.2 |
| 2009/0023450 | A1* | 1/2009 | George ................... | H04L 12/66 455/442 |

* cited by examiner

*Primary Examiner* — Kiet M Doan
(74) *Attorney, Agent, or Firm* — Leila A. Kanani; Stratus Law Group PLLC

(57) ABSTRACT

A distributed telecommunication network including a VPN, a cellular network, a LAN, an Ethernet network, a server, a database, all communicatively coupled to the backbone of the network, a Wi-Fi network, a firewall, and a mobile device, communicatively coupled to the Wi-Fi network and the cellular network, wherein the database is configured to store a profile of a user of the distributed telecommunication network, the profile including a biography of the user, user relationships, a plurality of posts, an activity level of the user, and wherein the server is configured to determine whether the profile belongs to a category using a weighted average of a biography indication related to the biography of the profile and a post indication related to posts and relationship indication related to user relationships.

12 Claims, 14 Drawing Sheets

Democrat Bio Profile 320A

| Term | Significant | Comments |
|---|---|---|
| uniteblue | Yes | Groups/Associations |
| liberal | Yes | Values |
| progressive | Yes | Values |
| lgbt | Yes | Discussion Topics |
| gunsense | Yes | Discussion Topics |
| animalrights | Yes | Discussion Topics |
| feminist | Yes | Identity |
| hillary | Yes | Political Candidates |
| domestic violence | Yes | Discussion Topics |
| atheist | Yes | Identity |
| union | Yes | Discussion Topics |

Republican Bio Profile 320B

| Term | Significant | Comments |
|---|---|---|
| teaparty | Yes | Groups/Associations |
| conservative | Yes | Values |
| tcot | Yes | Groups/Associations |
| nra | Yes | Groups/Associations |
| christian | Yes | Identity |
| cruz | Yes | Political Candidates |
| constitution | Yes | Discussion Topics |
| israel | Yes | Discussion Topics |
| profile | Yes | Discussion Topics |
| catholic | Yes | Identity |
| gun | Yes | Discussion Topics |

FIG. 3

Parents 602

| Brand | Direct Mentions | Hashtag Mentions | Indirect Mentions |
|---|---|---|---|
| Brand 1 | # | # | # |
| Brand 2 | # | # | # |
| Brand 3 | # | # | # |
| Brand 4 | # | # | # |
| Brand 5 | # | # | # |

General Population 604

| Brand | Direct Mentions | Hashtag Mentions | Indirect Mentions |
|---|---|---|---|
| Brand 6 | # | # | # |
| Brand 7 | # | # | # |
| Brand 8 | # | # | # |
| Brand 9 | # | # | # |
| Brand 10 | # | # | # |

FIG. 6

Parents 702

| Celebrity | Direct Mentions | Hashtag Mentions | Indirect Mentions |
|---|---|---|---|
| Celebrity 1 | # | # | # |
| Celebrity 2 | # | # | # |
| Celebrity 3 | # | # | # |
| Celebrity 4 | # | # | # |
| Celebrity 5 | # | # | # |

General Population 704

| Celebrity | Direct Mentions | Hashtag Mentions | Indirect Mentions |
|---|---|---|---|
| Celebrity 6 | # | # | # |
| Celebrity 7 | # | # | # |
| Celebrity 8 | # | # | # |
| Celebrity 9 | # | # | # |
| Celebrity 10 | # | # | # |

FIG. 7

Parents 702

| Show | Direct Mentions | Hashtag Mentions | Indirect Mentions |
|---|---|---|---|
| Show 1 | # | # | # |
| Show 2 | # | # | # |
| Show 3 | # | # | # |
| Show 4 | # | # | # |
| Show 5 | # | # | # |

General Population 704

| Show | Direct Mentions | Hashtag Mentions | Indirect Mentions |
|---|---|---|---|
| Show 6 | # | # | # |
| Show 7 | # | # | # |
| Show 8 | # | # | # |
| Show 9 | # | # | # |
| Show 10 | # | # | # |

FIG. 8

DISTRIBUTED TELECOMMUNICATION NETWORK ARCHITECTURE AND DATABASE QUERY FOR AUDIENCE SEGMENTATION AND ANALYSIS

PRIORITY AND RELATED APPLICATION

This application claims priority to the provisional U.S. Patent Application No. 62/472,608, filed on Mar. 17, 2017, and to the provisional U.S. Application Ser. No. 62/479,650, filed on Mar. 31, 2017, all of which are hereby incorporated by reference herein in its entirety as if set forth herein.

TECHNICAL FIELD

This description relates generally to telecommunication networks, and more particularly to intelligent distributed telecommunication networks.

BACKGROUND

Telecommunication networks provide interconnectivity among remotely located devices. The backbone of telecommunication networks may include optical fibers, microwave links, and other wired or wireless links. The devices that are interconnected by telecommunication networks may include industrial equipment and devices, household devices such as smart interconnected appliances and home sensors, medical equipment, smart handheld devices, multimedia devices, personal computers, servers, cellphones, etc.

Modern targeted communications use distributed telecommunication networks making access and querying remote databases possible. Targeted communication may also use identification and analysis of different individuals and groups of individuals by querying related databases over distributed telecommunication networks. Distributed databases over networks may be one available source that can provide information about individuals, and the groups with which they are affiliated.

Traditionally, a profile in a remote database may provide a sparse picture of identity. Most demographic, interest, and group affiliations of individuals are not explicitly identified. When approaches to analyzing data is developed, the approaches may soon become outdated because content in the remote database may be very dynamic.

BRIEF DESCRIPTION OF THE DRAWINGS

The Detailed Description is set forth with reference to the accompanying figures.

FIG. 3 depicts example results that can be generated by some embodiments.

FIG. 6 depicts a comparison of results (e.g., brand associations) for the two different example groups that can be generated by some embodiments.

FIG. 7 depicts a comparison of results (e.g., celebrity associations) for the two different example groups that can be generated by some embodiments.

FIG. 8 depicts a comparison of results (e.g., show associations) for the two different example groups that can be generated by some embodiments.

DETAILED DESCRIPTION

Figure 1:
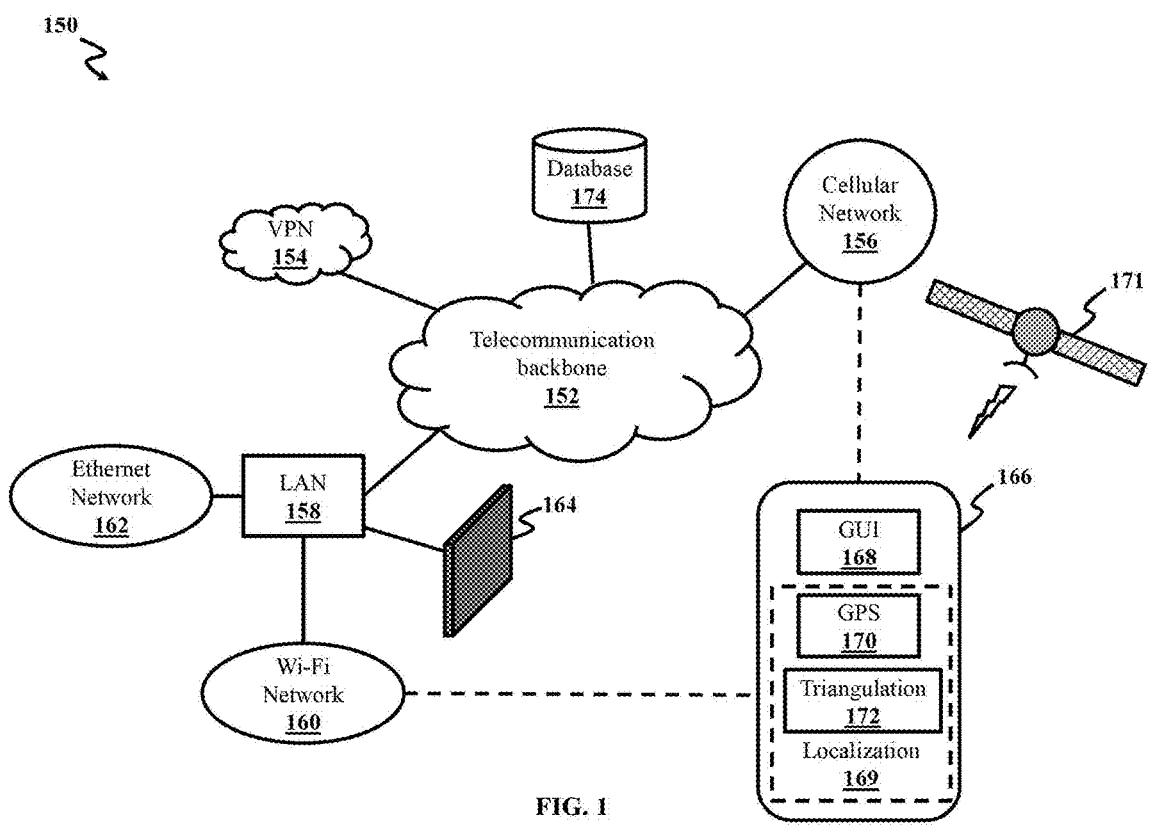
FIG. 1 is a schematic diagram illustrating a telecommunication network and remote devices databases, used by some embodiments.

Distributed telecommunication networks are used to connect databases and end system devices such as cellular phones, smart phones or other devices. In some examples herein, a location service of a device may be determined. The location may be determined using a localization system on a mobile device of the user. In an example, a global positioning system (GPS) module in the device may determine the location of the user. In another example, a triangulation mechanism, using the cellular network base stations may be used to determine the location of the user. In an example, a combination of GPS and triangulation may be used for determining location. In an example, such connected networks may be used to provide social media services. The location of the user may also be automatically added to a social media post by the user.

Social media data may provide a sparse picture of identity of an individual. Some embodiments enrich identity by using artificial intelligence (AI) to analyze information such as sensor data, networked data sources, and configuration options. In an embodiment, the end user may include any of a heartbeat sensor, a temperature sensor, an acoustic sensor, a temperature sensor, a fingerprint sensor, a gyroscope, a pressure sensor, and optical sensor, etc.

Some embodiments use sets of features of a profile to analyze information. These features can be stored in a database, and include preset features and features that can be adapted to consider interactions among evolving sets of information, including slang terms, tags (e.g., hashtags), cliques (e.g., Emo, jock), beliefs (e.g., God, climate change, tolerance of different people), family characteristics (e.g., nuclear, blended, same-sex couple, parent), specific group afflation (e.g., ACLU, NRA, Protestant, Republican, Democrat), and amorphous group affiliation (e.g., conservative, liberal, progressive, tea party). The foregoing examples are non-limiting, and provide some illustrations of features considered by some embodiments. Some embodiments herein include learning features using AI.

In an example of AI learning by some embodiments, people who use the hashtag #PTPA in social media posts are likely to be parents. This is an example of a learned feature (use of #PTPA). By noting the appearance of this hashtag along with other content typical of parents, some embodiments can incorporate this feature into future analysis of content.

One value of this is that the content in social media is very dynamic (e.g., during election season, certain language used may be more indicative of liberal versus conservative leaning, but after elections, the language may be automatically adapted based on current issues). The self-adapting capabilities of some embodiments can improve the process of real-time audience segmentation. In embodiments, the meanings attached to a terminology or hashtag may therefore change over time, and may depend on current states of things, such as an ongoing election, a major sports event, a special holiday or time of the year, a natural disaster, a humanitarian crisis, etc.

Embodiments that use systems and methods discussed herein can enable the tailoring of advertisements to a particular demographic or, conversely, learn about how a particular demographic feels about a subject or a product.

FIG. 1 is a schematic diagram of a distributed telecommunication network 150. The distributed telecommunication network 150 may include a virtual private network (VPN) 154, communicatively coupled to a backbone 152 of the distributed telecommunication network 150. The distributed telecommunication network 150 may include a cellular network 156, communicatively coupled to the backbone 152 of the distributed telecommunication network 150.

The distributed telecommunication network 150 may include a local area network (LAN) 158, communicatively coupled to the backbone 152 of the distributed telecommunication network 150. The distributed telecommunication network 150 may include an Ethernet network 162, communicatively coupled to the local area network 158. The distributed telecommunication network 150 may include a Wi-Fi network 160, communicatively coupled to the local area network 158.

The distributed telecommunication network 150 may include database 174 communicatively coupled to the backbone 152 of the distributed telecommunication network 150. In an example, the distributed telecommunication network 150 may include multiple databases communicatively coupled to the backbone 152 of the distributed telecommunication network 150. All devices that are communicatively coupled to the distributed telecommunication network 150 may access the database 174, or the multiple databases communicatively coupled to the backbone 152 of the distributed telecommunication network 150.

The distributed telecommunication network 150 may include a firewall 164 for security purposes, communicatively coupled to the local area network 158. The distributed telecommunication network 150 may include a mobile device 166, communicatively coupled to the Wi-Fi network 160 and the cellular network 156. The mobile device 166 may include a graphical user interface (GUI) 168 for receiving commands and display text and graphic data received over the distributed telecommunication network 150.

The mobile device 166 may include a localization module 169, communicatively coupled to the GUI 168. The localization module 169 may include, a global positioning system (GPS) module 170 communicatively coupled to a geo satellite 171, and configured to initialize a determination of a location of the mobile device 166. The localization module 169 may include a triangulation module 172 communicatively coupled to the cellular network 156, and configured to determine an accurate location of the mobile device using the initial determination of the location by the GPS module 170.

Figure 2A:
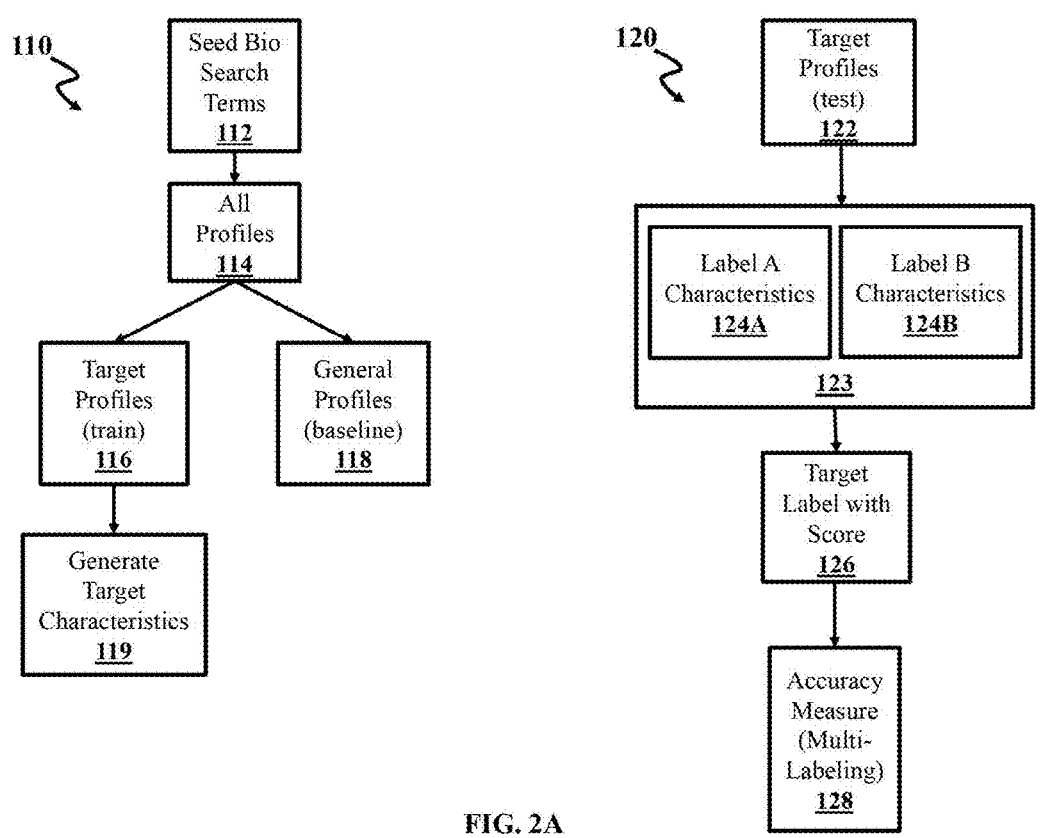
FIG. 2A depicts examples of a profile maker and a profile scorer, used by some embodiments.

FIG. 2A is a schematic diagram illustrating examples of a profile maker 110 and a profile scorer 120, according to some embodiments herein. The goal of some embodiments is to identify a diverse range of demographic profiles (e.g., as discussed above: behavioral, interest, etc.). A diverse range of demographic profiles may be important and useful for several activities, e.g., social economic research studies (understanding sample demographics), marketing (targeted advertising), etc.

An approach used by some embodiments involves finding highly correlated word/term associations with certain demographics profiles either in the biographical information or content generated by individuals matching the demographic profiles. Each identified new bio may then be scored against other profiles to find the most likely match.

In an example, the profile maker 110 starts with a set of seed bio search terms 112. These seed bio search terms 112 can comprise one or more sets of bio characteristics that are commonly associated with, individuals and/or groups of interest (e.g., "mother", "mom", "parent").

The seed bio search terms 112 is queried against all available bios 114 to yield target profiles 116, i.e. those that include the seed search terms, and general, bio 118, i.e. a baseline population that may or may not include the seed search terms. An example implementation starts with a list of target profiles 116 that are labelled (e.g., based on their political party affiliation, for example either democrat or republican).

From target profiles 116, target characteristics 119 can be generated. In some embodiments, target profiles 116 represents a set of profiles that are reflective of a particular demographic of interest.

In some embodiments, the bios from labeled target profiles 116 are compared to bios of a general population to determine statistically significant bio terms. Target characteristics 119 can be generated based on the statistically significant words. Target characteristics 119 thus may contain highly correlated term associations in the biographical description of a person in a particular demographic/group.

In some embodiments, the social activity from labeled target profiles 116 are compared to social activity of a general population to determine statistically significant terms/words, e.g., #PTPA as discussed above. Target characteristics 119 can be generated based on the statistically significant words. Target characteristics 119 thus may contain highly correlated term associations in the content generated by a person in a particular demographic/group, e.g., Twitter tweets, Instagram posts, and Facebook shares.

In some embodiments, the social relationships/graph of the labeled target profiles 116 are compared to social relationships/graph of a general population to determine statistically significant social accounts that tend to be associated to target profiles 116. Target bio profile 119 can be generated based on the statistically significant accounts. Target profile 119 thus may contain highly correlated social accounts in the social graph or social activity of a person in a particular demographic/group.

The term associations detected by some embodiments can include both evergreen terms (persistently associated with an individual, e.g., race, religion) and seasonal terms (terms that change based on external factors, e.g., conservative or liberal terms during an election cycle). The lists of terms can change dynamically based on analyzed data (e.g., #PTPA added to analysis for parent based on current trends).

Profile scorer 120 uses target profiles 122 as a starting point. In some embodiments target profiles 122 is the same as generated target profile 119, and in some embodiments target profiles 122 results from different processes, e.g., the modification of generated target profiles 119 based on different factors.

Profile scorer 120 uses Label A characteristics 124A and Label B characteristics 124B for scoring purposes. In some embodiments Label A characteristics 124A is the same as generated target characteristics 119 for a process based on seed search terms associated with Label A. In some embodiments Label B characteristics 124B is the same as generated target characteristics 119 for a process based on seed search terms associated with Label B.

In comparison phase 123, data corresponding to people matching target profile 122 (e.g., the demographic of interest) are compared to characteristics of known groups of interest (e.g., republican characteristics 124A and democrat characteristics 124B) to determine which people affiliate with which group.

A target label 126 is generated, along with a score that measures how closely target label 126 matches the groups of interest. In some embodiments, given a diverse range of demographic profiles analyzed, each target label 126 is matched against a profile (e.g., target bio profile 119), and a likelihood score of a match is generated.

Scoring of the profiles may be determined to include accuracy measures 128. Each bio analyzed by embodiments can be labeled with a range of demographic profiles based on the likelihood score (also referred to as "multilabeling").

Another use-case for embodiments is the tracking of people through life-stages—for example: In School, Career, Married, New Parent, Kids in School, Empty Nester, Retired. Some embodiments can track how the language of every new generation has nuances that change very fluidly. For example, by learning how newly married millennials speak—some embodiments adapt and predict that other people who use of those language cues are likely to be newly married as well.

Other use cases for embodiments involve advertising. Embodiments can push smarter social advertising, push smarter ads on a mobile GPS when navigating (e.g. if parents show affinity for Chic-Fil-A over Potbelly, a GPS can suggest appropriate nearby food options based on the location and also the preference). In an embodiment, the resonant suggestion may be determined with a weighted combination of the preferences the parent indicated on his/her profile and the location indicated by the GPS and the location of multiple restaurants nearby.

The embodiment may give priority to the location or the preference using the weights. The embodiment may then dynamically change the weights based on the behavior or response of the parent to learn the best suggestion for the parent. For example, when an embodiment suggests a particular restaurant that is not high in the rank of the preference of the parent but is nearby, and the parent accepts the suggestion, or actually goes to that restaurant, the embodiment may increase the weight of the location and decrease the weight of the preference with a similar or different increments and decrements.

An embodiment may determine the acceptance of the parent by prompting the suggestion and receiving a feedback from the end device. In an embodiment, the verification of whether the parent actually chose that restaurant may be done using the GPS and verifying whether the device location matched the location of the suggested restaurant within a time threshold. In an embodiment, the weight assigned to the location may increase by a different (higher) value when the parent actually went to the suggested restaurant, compared to when the only information is that the parent accepted the suggestion.

Use cases for embodiments involve market research. For example, embodiments can provide the ability to react faster to market trends without running expensive and time consuming focus groups.

Embodiments described herein may predict both demographics traits (i.e., marital status, etc.) and behavioral/interest groups (i.e., political affiliations, religious beliefs, fashion, music, etc.).

An embodiment may rely on labelled data to train the model, either hand-annotating users, or relying on a secondary source to annotate users. Because some embodiments develop labels from the metadata of users (i.e., bio description), some embodiments do not require either of these two activities.

Some embodiments herein do not rely on hand-annotation or on secondary sources, therefore the embodiments can provide a wider spectrum of demographics and behavioral/interest groups.

Some embodiments predict demographic traits and behavioral/interest groups that can scale to geographic location, and time (or interest groups that change over time).

Based on the demographics traits and behavioral/interest groups, some embodiments provide bio descriptions, user generated content (e.g., tweets), direct and indirect mentions, associations, followers/follows that are correlated to different groups. Based on the approaches described herein, embodiments can provide advertisers highly informative data points to help connect with target groups.

Figure 2B:
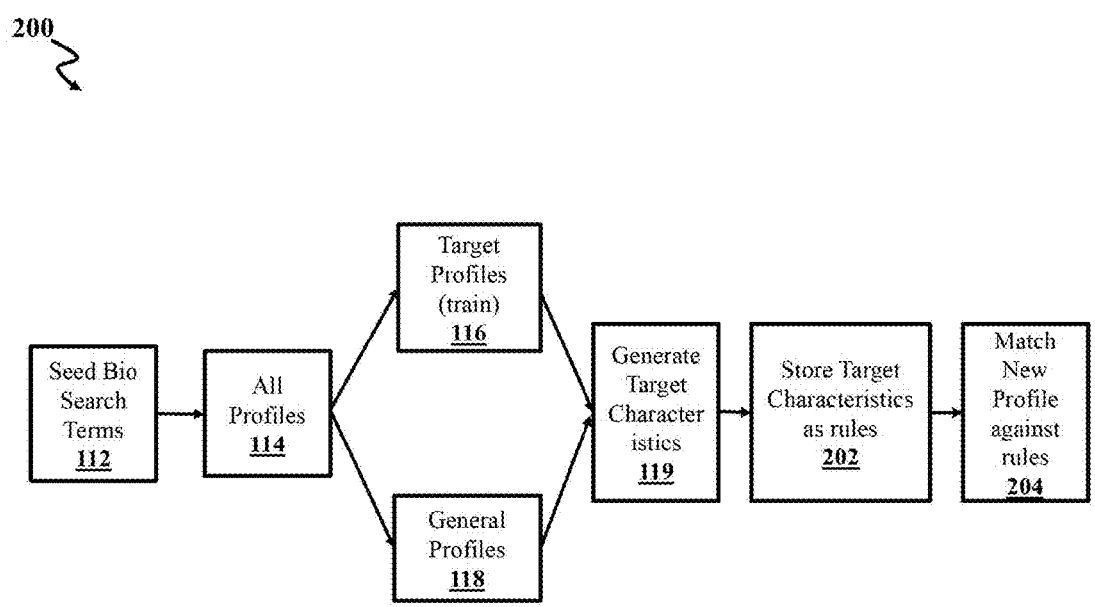
FIG. 2B depicts different aspects of matching a new bio against a database of profiles, according to some embodiments.

FIG. 2B is a schematic diagram illustrating matching a new profile against a database of profiles, according to some embodiments. An embodiment herein identifies diverse range of demographic profiles (including behavioral, interests, etc.) in 202. An embodiment starts with a list of target profiles that include seed biographic terms (for example self-identify with a political party affiliation, such as democrat or republican).

These target profiles may then be compared against general population to find statistically significant bio terms/words and/or statistically significant activity terms/words and/or statistically significant social relationships that correlates with a profile to be labeled a certain way. Using these analysis, statistically significant words and/or related social accounts are determined. From statistically significant words or related social accounts, characteristics may be identified (this profile contains highly correlated term associations either in the bio description tweets, for example). This profile contains both evergreen terms as well as seasonal terms and changes dynamically.

Given a diverse range of demographic profiles, each new profile may then be matched against determined characteristics and given a likelihood score of a match in 204. Each profile is then labelled with a range of demographic labels.

This may be used in social economic research studies (understanding sample demographics), for marketing purposes (e.g. targeted advertising), etc. An embodiment herein finds highly correlated word/term associations with certain demographics profiles either in their bio or tweets. A new profile may then be scored against rules to find the most likely match in 204.

FIG. 3 depicts example results that may be generated by some embodiments. The profiles may have a rich information about what each type of bio associates with. Findings may be different entities with which bios can be associated, for example groups/associations, values, discussion topics, and identity. For example, Democrat bio profile 320A and Republican bio profile 320B show the terms that can be indicative of a group, and which aspect of an individual is associated with a term. For example, "uniteblue" may be a term associated with the groups/associations of a Democrat, while "teaparty" may be a discussion topic associated with a Republican.

Figure 4:
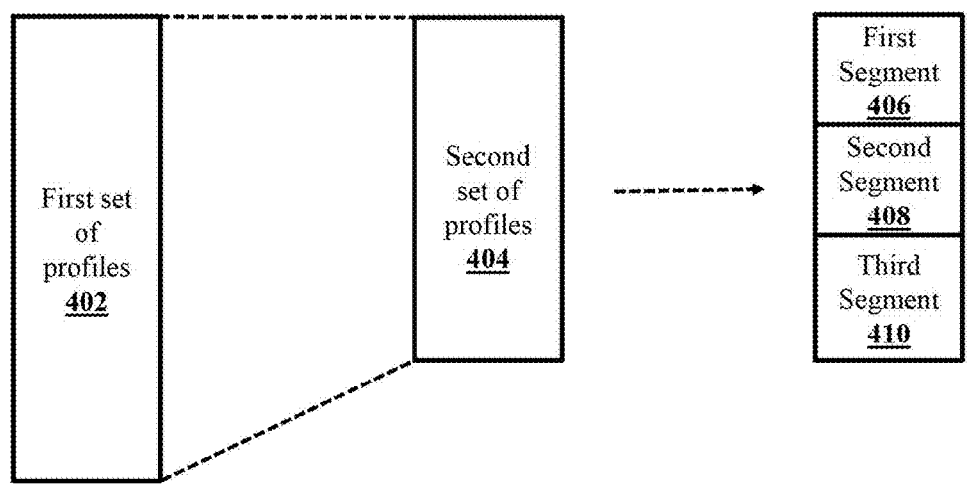
FIG. 4 depicts characteristics of a sample use case for which some embodiments can be configured to enable.

FIG. 4 is a schematic diagram illustrating characteristics of a sample profile according to an exemplary embodiment herein. In an embodiment, a first set of profiles 402 is selected based on general feeds, use of a clear and specific profile or bio description or label that identifies the profile as belonging to the first set. For example, the first set of profiles may be of those who are a mother. If clearly and specifically the bio includes the label of "mother" or "mom," the profile is categorized in the first set of profiles 402.

In an embodiment herein, a second set of profiles 404 is created that include terms or keywords that imply the individual belongs to the first set of profiles 402. For example, if a profile is labeled to be owned as a female, and contains the phrase "my son" somewhere, it is implied that the profile belongs to a mother. Using such keyword search enables the embodiment to generate an indicator of the percentage of individuals who would capture the keyword.

In an embodiment, the second set of profiles is divided into multiple segments, for example into a first segment 406, a second segment 408, and a third segment 410. In an embodiment, these segments provide insights as to what these individuals talk about on their profiles, and can be used to further infer their behavioral traits and also demography. Given these segments, an embodiment may use them to identify the individuals belonging to the first set of profiles 402 or the second set of profiles 404 among the general population.

The segmentation may be done using information such as geographical location of the individuals, personal interests, style, fitness, personality, age, employment, etc.

Figure 5A:
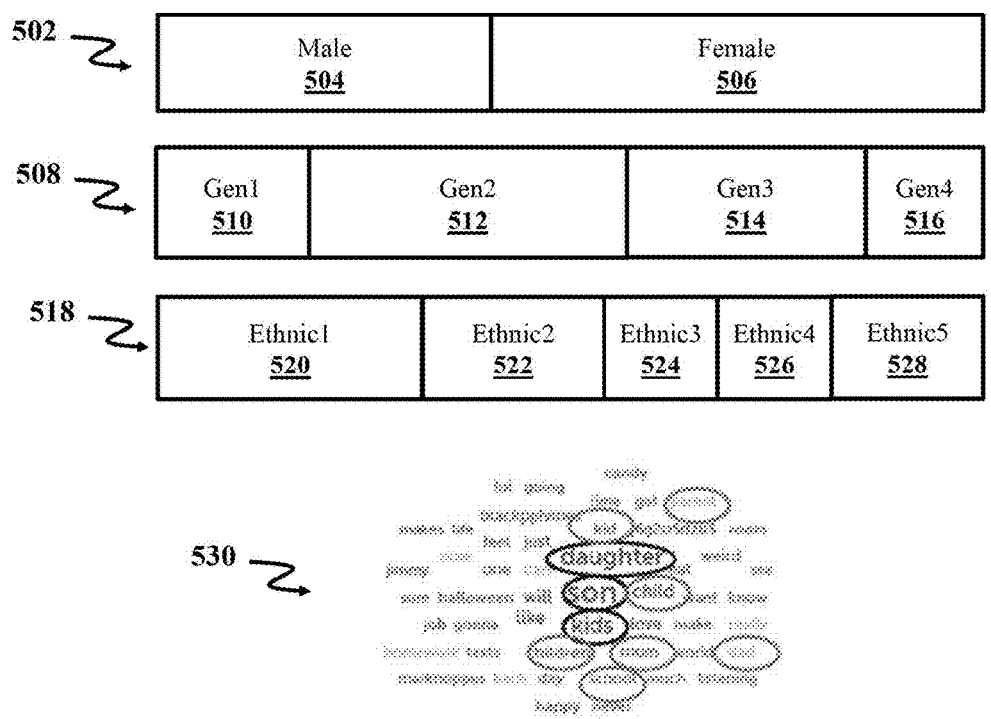
FIG. 5A depicts a comparison of feature results for an example group, that can be generated by some embodiments.
Figure 5B:
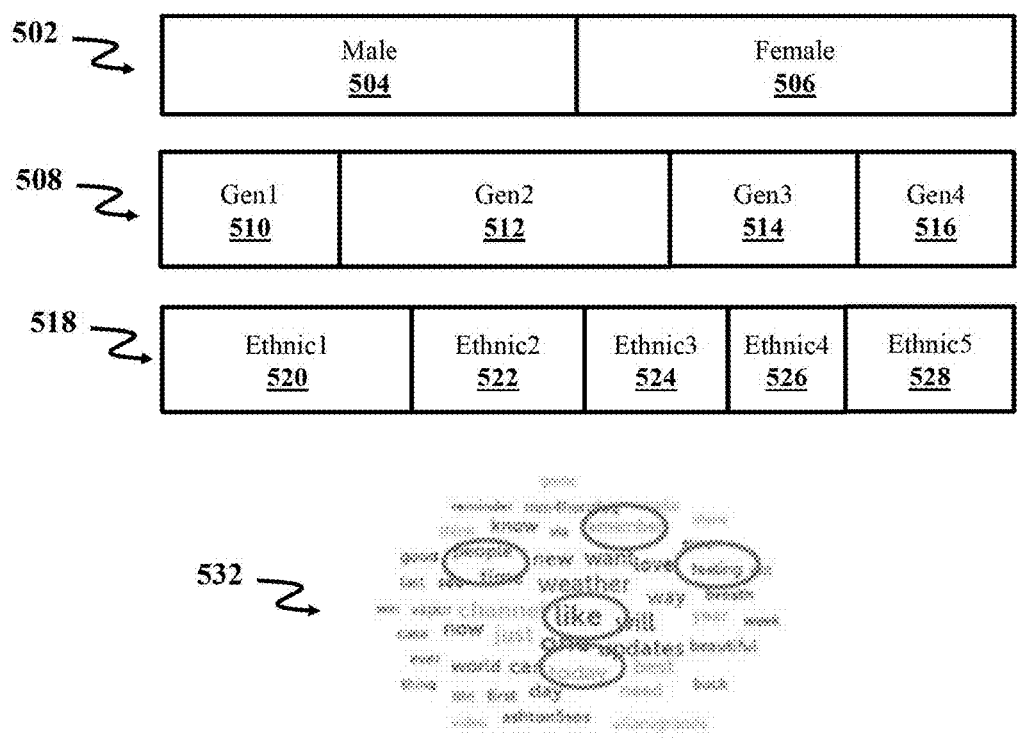
FIG. 5B depicts a comparison of feature results for an example group, that can be generated by some embodiments.

FIGS. 5A and 5B depicts a comparison of feature results for two example groups that can be generated by some embodiments. In an example, the first group illustrated in FIG. 5A may be parents. An embodiment either uses earlier studies, surveys, or initial samples to generate the sets of profiles.

In an embodiment, the profiles may be also divided based on gender 502, indicating male 504 or female 506. The profiles may also be categorized based on the generations 508, for example first generation 510, second generation 512, third generation 514, fourth generation 516. The profiles may also be categorized based on ethnic groups 518, for example first ethnic group 520, second ethnic group 522, third ethnic group 524, fourth ethnic group 526, fifth ethnic group 528.

An embodiment may determine that the profile belongs to a certain category, for example to a parent based on certain keywords that appear in the profile and their frequency. For example, if the circled keywords in the keywords 530 appear more than a certain number in a profile, the profile may be categorized as a parent, and vice versa, these keyboards are more likely to appear in a profile belonging to a parent than to the general population.

FIG. 5B illustrates similar categories as to FIG. 5A, but with respect to general population. As illustrated, the gender, generation, and the ethnicity distribution may be different for the general population compared to the same statistics only for the parents. Also the keywords 532 that are more likely to appear in the general population profiles may be different than keywords 532 that appear more likely in a parent profile.

FIG. 6 depicts another comparison of results (e.g., brand associations) for the two different example groups that can be generated or used by some embodiments. As used herein, associations (e.g., brand associations) can be affinity, aspiration, ownership of a product, etc. In an embodiment, parents 602 may have association with brands 1 through 5. The general population 604 may have association with brands 6 through 10. In an embodiment, some of the brands 1 through 5 may be similar to some of the brands 6 through 10. The association with brands may be determine using criteria such as direct mentions, hashtag mentions, or indirect mentions in tweets or posts.

FIG. 7 depicts another comparison of results (e.g., celebrity associations) for the two different example groups that can be generated by some embodiments. In an embodiment, parents 702 may have association with celebrities 1 through 5. The general population 604 may have association with celebrities 6 through 10. In an embodiment, some of the celebrities 1 through 5 may be similar to some of the celebrities 6 through 10. The association with celebrities may be determine using criteria such as direct mentions, hashtag mentions, or indirect mentions in tweets or posts.

FIG. 8 depicts another comparison of results (e.g., show associations) for the two different example groups that can be generated by some embodiments. In an embodiment, parents 702 may have association with shows 1 through 5. The general population 604 may have association with shows 6 through 10. In an embodiment, some of the celebrities 1 through 5 may be similar to some of the shows 6 through 10. The association with shows may be determine using criteria such as direct mentions, hashtag mentions, or indirect mentions in tweets or posts.

FIG. 9 depicts an example social media data that some embodiments can be configured to use to enrich identity data about one or more individuals and groups. FIG. 9 illustrates how different parts of a person's profile (e.g., Twitter, user bio), can be analyzed to identify particular terms for use as discussed above. Additionally, the analysis of content (e.g., tweets) is also shown.

Figure 9A:
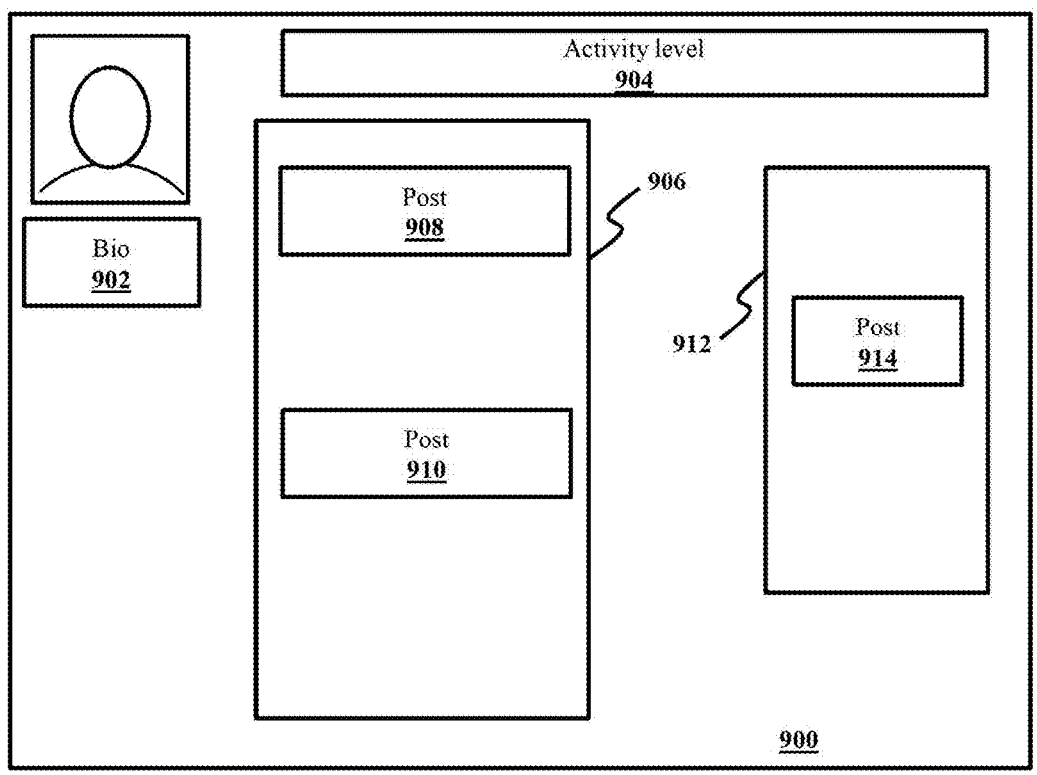
FIG. 9A depicts example social media data that some embodiments can be configured to use to enrich identity data of one or more individuals and groups.

FIG. 9A, illustrates an example profile page 900 of an individual. An embodiment analyzes any of Bio 902, activity level 904, posts 906, and linked posts 912 of the profile 900. In an embodiment, all these factors are taken into account to determine whether the individual belongs to a category, and how likely it is for the individual to belong to such category.

An embodiment evaluates the bio 902 to determine whether the individual has explicitly mentioned belonging to a category, for example being a mom. The posts 906 of the individual, for example posts 908 and 906 may also be analyzed to determine whether keywords that suggest the individual belongs to a particular group appears.

An embodiment may also analyze the posts 912 from shared from another account of the individual on another platform that may appear on the profile 900, for example post 914. Posts 912 are analyzed also for keywords that suggest the individual belongs to any particular group. For example, the phrase "my son" for a female individual suggests that she is a mom.

The results of the analysis above are combined using different, weights for each, to determine whether the individual belongs to the category. For example, if the information appears in the Bio 902, it is given a higher weight. Also the activity level 904 of the individual is used to change the weights given to any of the analysis results above, in particular of the posts 906. The activity level may include indictors such as number of friends, posts, etc.

Figure 9B:
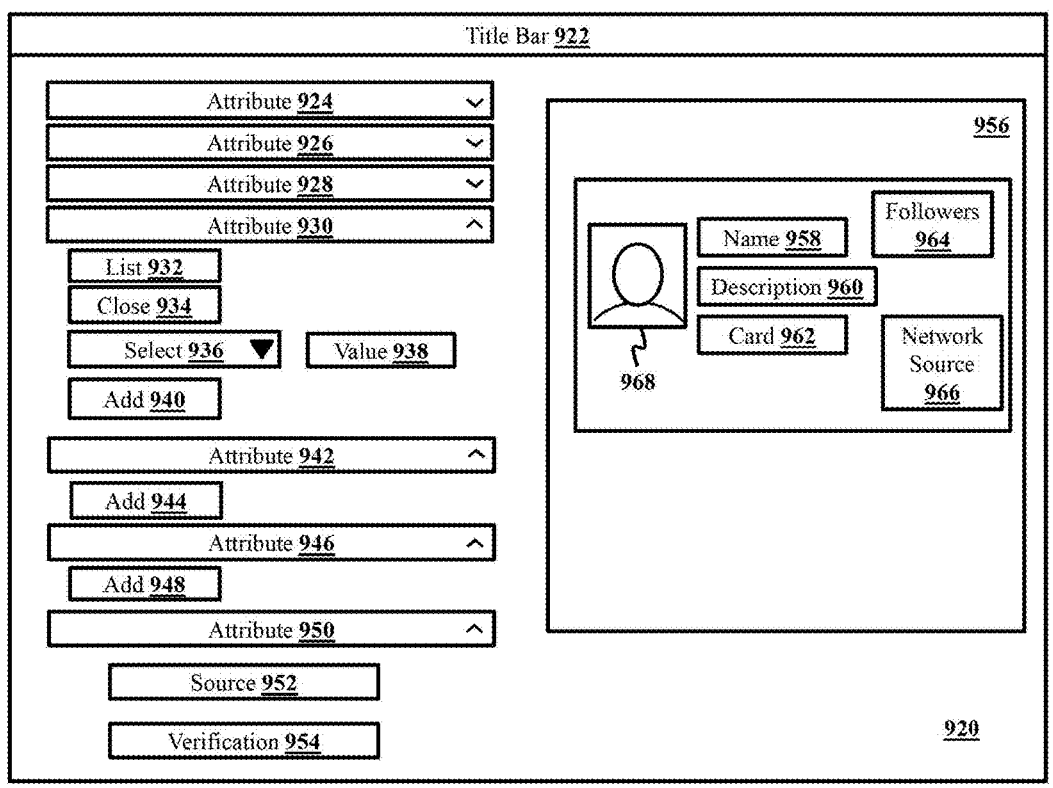
FIG. 9B depicts an example graphical user interface (GUI) for social media search in some embodiments.

FIG. 9B illustrates an example of a graphical user interface (GUI) 920 for querying profiles in the database according to an example herein. The GUI 920 may include a title bar 904 indicating that the GUI 920 is used for editing or filtering audience, for example to isolate ideal customer segments by searching for specific demographic, locational, or behavioral attributes.

The GUI 920 may include an attribute field 924 to select the demographic composition of the audience. The GUI 920 may include an attribute field 926 to select where the audience is located. The GUI 920 may include an attribute 928 to select how the audience describe themselves. The GUI 920 may include an attribute 930 to select what interests or passions do the audience have. The GUI 920 may include an attribute 942 to select the brands or companies the audience interact with. The GUI 920 may include an attribute 946 to select the accounts (for example, social media handler of the social media accounts) that follow the audience, or is followed by the audience.

In an example, the attributes 924, 926, 928, 930, 942, and 946 may each include a pull down menu for selecting the corresponding attribute. In an example, by opening the pull down menu, a link may appear for viewing a list of the corresponding attribute. In an example or a link for adding keywords related to the attribute may also appear.

For example, by opening the pull down menu 930, the GUI 920 may display a hyperlink 932 to display a list of values for the attribute 930. By clicking on the hyperlink list 932, the GUI 920 may display a pull down menu 936 for selecting a particular type of the attribute 930, and a filed 938 for entering a value corresponding to the attribute 930. The GUI 920 may also display a close button 934 for closing the select menu 936 and the value filed 938.

In an example, by opening the pull down menu of attributes 930, 942, and 946, the GUI 920 may display hyperlinks 940, 944, and 948 for adding corresponding attributes.

The GUI 920 may include an attribute 950 indicating, for example, a social media source 952 for the intended audience, or a verification status 954 of the intended audience. The social media source 952 maybe a radio button, or a check box selector among multiple listed social media sources. The verification status 954 may include a radio button selector among "isolate verified", "exclude verified", or "no preference" values. The verified audience may refer to a verification of the audience by a communicatively connected verification engine.

After selecting the desired attributes, the GUI 920 may display an audience list 956 that have the selected attributes. The audience list 956 may for example include an image 968, a name field 958, description field 960, and an electronic card (E-card) field 962. Each listed audience on the audience list 956 may also include a follower field 964 that displays a number of followers of the listed item, or a number of those who are followed by the listed item. Each listed item on the audience list 956 may also include a network source 966 indicating the source, for example the social media source, of the listed audience.

Figure 10:
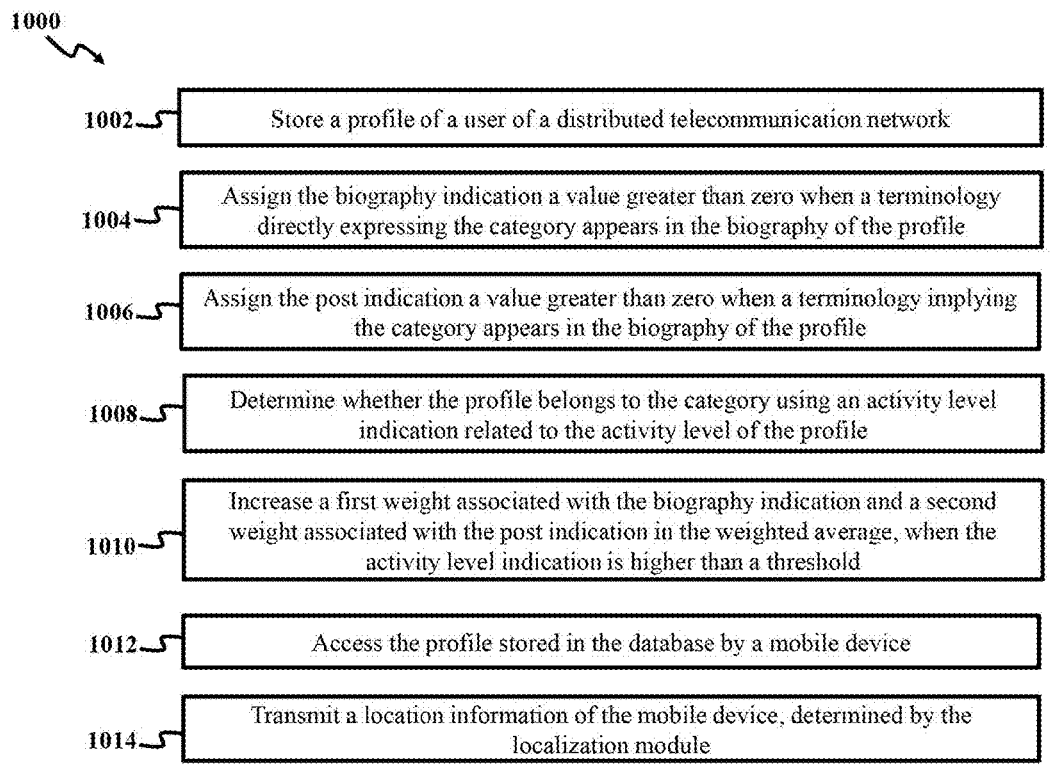
FIG. 10 is a flowchart illustrating a method according to an example herein.

FIG. 10 is a flowchart illustrating a method 1000 according to an example herein. In an example, at step 1002 the method 1000 may store a profile of a user of a distributed telecommunication network, the profile including a biography of the user, a plurality of posts, an activity level of the user, and wherein the server is configured to determine whether the profile belongs to a category using a weighted average of a biography indication related to the biography of the profile and a post indication related to the plurality of posts, wherein the distributed telecommunication network includes a virtual private network (VPN), communicatively coupled to a backbone of the distributed telecommunication network, a cellular network, communicatively coupled to the backbone of the distributed telecommunication network, a local area network (LAN), communicatively coupled to the backbone of the distributed telecommunication network, an Ethernet network, communicatively coupled to the local area network, a Wi-Fi network, communicatively coupled to the local area network, a firewall, communicatively coupled to the local area network, a server communicatively coupled, to the local area network, a database communicatively coupled to the local area network, and a mobile device, communicatively coupled to the Wi-Fi network and the cellular network.

In an example, at step 1004, the method 1000 may assign the biography indication a value greater than zero when a terminology directly expressing the category appears in the biography of the profile. In an example, at step 1006 the method 1000 may assign the post indication a value greater than zero when a terminology implying the category appears in the biography of the profile. In an example, the category implication may include words or phrases synonymous with a description of the category.

In an example, at step 1008, the method 1000 may determine whether the profile belongs to the category using an activity level indication related to the activity level of the profile. In an example, at step 1010 the method 1000 may increase a first weight associated with the biography indication and a second weight associated with the post indication in the weighted average, when the activity level indication is higher than a threshold.

In an example, the mobile device includes a localization module, communicatively coupled to the GUI, including a global positioning system (GPS) module communicatively coupled to a geo satellite, and configured to initialize a determination of a location of the mobile device, and a triangulation module communicatively coupled to the cellular network, and configured to determine an accurate location of the mobile device using the initial determination of the location by the GPS module. In an example, at step 1012, the method 1000 may access the profile stored in the database. In an example, at step 1014, the method 1000 may transmit a location information of the mobile device, determined by the localization module, to the server.

Figure 11:
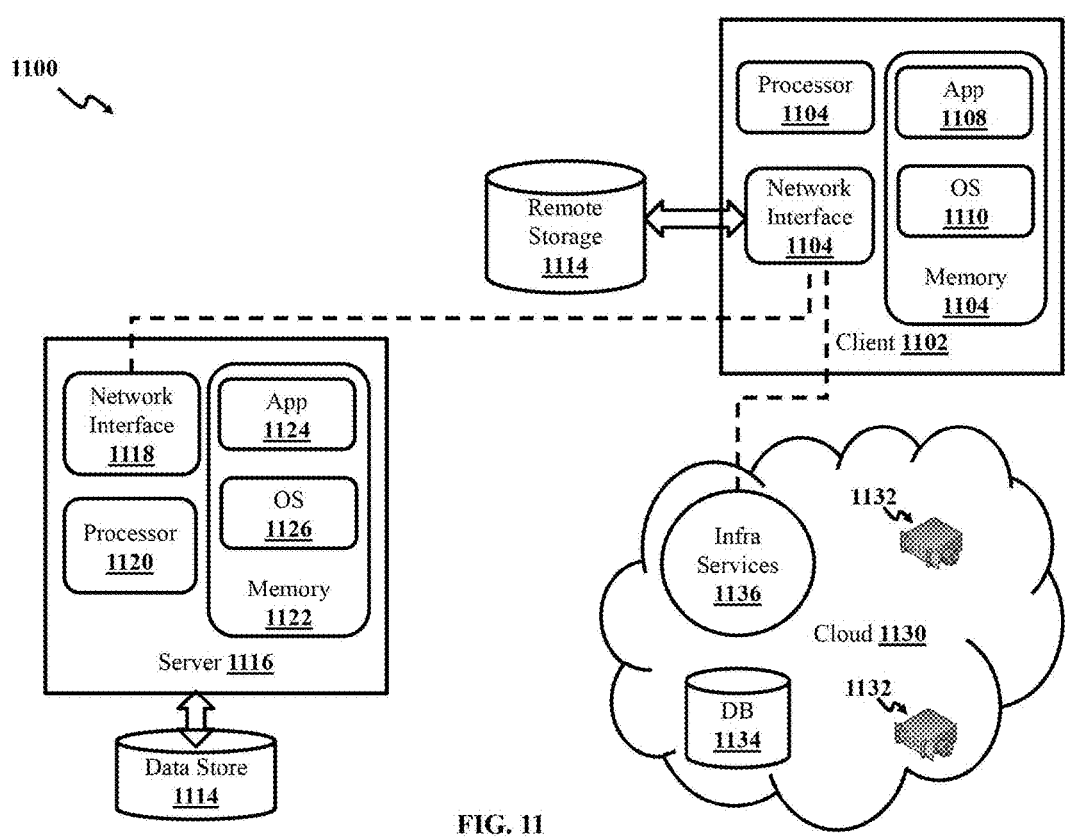
FIG. 11 is a schematic diagram illustrating an exemplary hardware, software and communications environment that can be configured to implement some embodiments.

FIG. 11 is a context diagram 1100 of interconnected electronic devices and data sources configured to implement some embodiments, e.g., hardware, software, and communications environment.

Client device 1102 can be any computing device. Exemplary computing devices include without limitation networked personal computers, tablet computers, smart phones, and smart televisions and/or media players.

A client device 1102 may have a processor 1104 and a memory 1106. Client device's 1102 memory 1106 is any computer-readable media which may store several software components including an application 1108 and/or an operating system 1110. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, client device 1102 may have a network interface 1112. The network interface 1112 may be one or more network interfaces including Ethernet, Wi-Fi, WLAN, Bluetooth, or any combination of other physical and data link standard interfaces. In the case where the user need only do operations on a standalone single machine, the network interface 1112 is optional.

Some embodiments use client device 1102 to collect demographic information from one or more individuals. Information can be collected by monitoring activity on the client device (e.g., websites visited, posts made to online applications), and/or requesting information from a user.

In some embodiments, client device 1102 can be used to display results of the generation and application of profiles.

Client-Server/Multi-Tier

Client device 1102 may communicate to a server 1116. Server 1116 is any computing device that may participate in a network, e.g., server, database server, web server, etc. The network may be, without limitation, a local area network ("LAN"), a virtual private network ("VPN"), a cellular network, or the Internet. The client network interface 1112 may ultimately connect to remote networked storage 1114, or to server 1116 via server network interface 1118. Server network interface 1118 may be one or more network interfaces as described with respect to client network interface 1112.

Server 1116 also has a processor 1120 and memory 1122. As per the preceding discussion regarding client device 1102, memory 1122 is any computer-readable media including both computer storage media and communication media.

In particular, memory 1122 is configured to store software which may include an application 1124 and/or an operating system 1126. Memory 1122 may also store applications 1124 that may include without limitation, an application server and a database management system. In this way, client device 1102 may be configured with an application server and data management system to support a multi-tier configuration.

Server 1116 may include a data store 1128 accessed by the data management system. The data store 1128 may be configured as a relational database, an object-oriented database, a NoSQL database, and/or a columnar database, or any configuration to support scalable persistence.

Cloud

The server 1116 need not be on site or operated by the client enterprise. The server 1116 may be hosted in the Internet on a cloud installation 1130. The cloud installation 1130 may represent a plurality of disaggregated servers which provide virtual web application server 1132 functionality and virtual database 1134 functionality. Cloud services 1130, 1132, and 1134 may be made accessible via cloud infrastructure 1136. Cloud infrastructure 1136 not only provides access to cloud services 1132 and 1134 but also billing services. Cloud infrastructure 1136 may provide additional service abstractions such as Platform as a Service ("PAAS"), Infrastructure as a Service ("IAAS"), and Software as a Service ("SAAS").

In some embodiments, data store 1128 is configured to store data collected, data to be analyzed, and/or the results of the analysis by embodiments. Server 1116 can perform the collection and analysis of demographic data discussed above, and also serve out the results of the analysis, e.g., to client device 1102.

In some embodiments, cloud 1130 can be used, for example as a source of data discussed above, a storage location for data discussed above, and as a site of processing/analysis discussed above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A distributed telecommunication network comprising:
 a virtual private network (VPN), communicatively coupled to a backbone of the distributed telecommunication network;
 a cellular network, communicatively coupled to the backbone of the distributed telecommunication network;
 a local area network (LAN), communicatively coupled to the backbone of the distributed telecommunication network;
 a server communicatively coupled to the backbone of the distributed telecommunication network;
 a database communicatively coupled to the backbone of the distributed telecommunication network;
 an Ethernet network, communicatively coupled to the local area network;
 a Wi-Fi network, communicatively coupled to the local area network;
 a firewall, communicatively coupled to the local area network; and
 a mobile device, communicatively coupled to the Wi-Fi network and the cellular network, the mobile device comprising:
 a graphical user interface (GUI) for receiving commands and display text and graphic data received over the distributed telecommunication network; and
 a localization module, communicatively coupled to the GUI, comprising:
 a global positioning system (GPS) module communicatively coupled to a geo satellite, and configured to initialize a determination of a location of the mobile device; and
 a triangulation module communicatively coupled to the cellular network, and configured to determine an accurate location of the mobile device using an initial determination of the location by the GPS module;
 wherein the database is configured to store a profile of a user of the distributed telecommunication network, the profile comprising a biography, relationships of the user to other users, a plurality of posts, an activity of the user, and wherein the server is configured to determine whether the profile belongs to a category using:
  a weighted average based on the biography of the profile, the relationships of the users and the activity of the user; and
  a post indication comprises a value greater than zero when a terminology implying the category appears in the biography of the profile;
wherein the category comprises words or phrases synonymous with a description of the category, and wherein the mobile device is configured to:
  access the profile stored in the database; and
  transmit a location information of the mobile device, determined by the localization module, to the server.

2. The distributed telecommunication network of claim 1, wherein a biography indication comprises a value greater than zero when a terminology directly expressing the category appears in the biography of the profile.

3. The distributed telecommunication network of claim 1 further comprising an advertisement module, communicatively coupled to a memory device, the advertisement module configured to target a plurality of individuals associated with a combination of one or more segments, and wherein the server is configured to determine whether the profile belongs to the category using any of:
  an activity indication related to the activity of the profile; and
  a relationship indication related to the user relationships of the profile.

4. The distributed telecommunication network of claim 3 further comprising a content module configured to push content to any of a virtual or physical site communicatively coupled to the memory, wherein the content module is further configured to select content based on segments associated with a visitor to the virtual or virtual site, and wherein the server is further configured to increase a first weight associated with the biography indication and a second weight associated with the post indication in the weighted average and a third weight associated with the relationship indication in the weighted average.

5. A method comprising:
  storing a profile of a user of a distributed telecommunication network, the profile comprising a biography, a plurality of posts, user relationships, an activity level of the user, and wherein the server is configured to determine whether the profile belongs to a category using a weighted average of a biography indication related to the biography of the profile and a post indication related to the plurality of posts; and
  assigning the post indication a value greater than zero when a terminology implying the category appears in the biography of the profile, wherein the category comprises words or phrases synonymous with a description of the category,
wherein the distributed telecommunication network comprises:
  a virtual private network (VPN), communicatively coupled to a backbone of the distributed telecommunication network;
  a cellular network, communicatively coupled to the backbone of the distributed telecommunication network;
  a local area network (LAN), communicatively coupled to the backbone of the distributed telecommunication network;
  a server communicatively coupled to the backbone of the distributed telecommunication network;
  a database communicatively coupled to the backbone of the distributed telecommunication network;
  an Ethernet network, communicatively coupled to the local area network;
  a Wi-Fi network, communicatively coupled to the local area network;
  a firewall, communicatively coupled to the local area network; and
  a mobile device, communicatively coupled to the Wi-Fi network and the cellular network, wherein the mobile device comprising:
    a graphical user interface (GUI) for receiving commands and display text and graphic data received over the distributed telecommunication network; and
    a localization module, communicatively coupled to the GUI, comprising:
      a global positioning system (GPS) module communicatively coupled to a geo satellite, and configured to initialize a determination of a location of the mobile device; and
      a triangulation module communicatively coupled to the cellular network, and configured to determine an accurate location of the mobile device using the initial determination of the location by the GPS module;
wherein the method further comprising:
  accessing the profile stored in the database; and
  transmitting a location information of the mobile device, determined by the localization module, to the server.

6. The method of claim 5, further comprising assigning a biography indication a value greater than zero when a terminology directly expressing the category appears in the biography of the profile.

7. The method of claim 5, further comprising:
  targeting a plurality of individuals associated with a combination of one or more segments; and
  determining whether the profile belongs to the category using any of:
    an activity level indication related to the activity level of the profile; and
    a relationship indication related to the user relationships of the profile.

8. The method of claim 7, further comprising:
  pushing content to any of a virtual or physical site, wherein the content is selected based on segments associated with a visitor to the virtual or physical site; and
  increasing a first weight associated with the biography indication and a second weight associated with the post indication in the weighted average, when the activity level indication is higher than a threshold.

9. A non-transitory computer-readable medium storing instructions executable by one or more computes which, upon the execution, cause the one or more devices to perform operations of storing a profile of a user of a distributed telecommunication network, the profile comprising a biography, a plurality of posts, an activity level of the user, and wherein the server is configured to determine whether the profile belongs to a category using a weighted average of a biography indication related to the biography of the profile and a post indication related to the plurality of posts; and
  assigning the post indication a value greater than zero when a terminology implying the category appears in the biography of the profile, wherein the category comprises words or phrases synonymous with a description of the category,
wherein the distributed telecommunication network comprises:
- a virtual private network (VPN), communicatively coupled to a backbone of the distributed telecommunication network;
- a cellular network, communicatively coupled to the backbone of the distributed telecommunication network;
- a local area network (LAN), communicatively coupled to the backbone of the distributed telecommunication network;
- a server communicatively coupled to the backbone of the distributed telecommunication network;
- a database communicatively coupled to the backbone of the distributed telecommunication network;
- an Ethernet network, communicatively coupled to the local area network;
- a Wi-Fi network, communicatively coupled to the local area network;
- a firewall, communicatively coupled to the local area network; and
- a mobile device, communicatively coupled to the Wi-Fi network and the cellular network, wherein the mobile device comprising:
  - a graphical user interface (GUI) for receiving commands and display text and graphic data received over the distributed telecommunication network; and
  - a localization module, communicatively coupled to the GUI, comprising:
    - a global positioning system (GPS) module communicatively coupled to a geo satellite, and configured to initialize a determination of a location of the mobile device; and
    - a triangulation module communicatively coupled to the cellular network, and configured to determine an accurate location of the mobile device using the initial determination of the location by the GPS module;

wherein the method further comprising:
  accessing the profile stored in the database; and
  transmitting a location information of the mobile device, determined by the localization module, to the server.

10. The non-transitory computer-readable medium of claim 9, wherein the operations further comprising assigning a biography indication a value greater than zero when a terminology directly expressing the category appears in the biography of the profile.

11. The non-transitory computer-readable medium of claim 9, wherein the operations further comprising:
  targeting a plurality of individuals associated with a combination of one or more segments; and
  determining whether the profile belongs to the category using any of:
    an activity level indication related to the activity level of the profile; and
    a relationship indication related to the user relationships of the profile.

12. The non-transitory computer-readable medium of claim 11, wherein the operations further comprising:
  pushing content to any of a virtual or physical site, wherein the content is selected based on segments associated with a visitor to the virtual or physical site; and
  increasing a first weight associated with the biography indication and a second weight associated with the post indication in the weighted average, when the activity level indication is higher than a threshold.

* * * * *